(12) United States Patent
Winter

(10) Patent No.: US 8,293,390 B2
(45) Date of Patent: Oct. 23, 2012

(54) CELL STACK FOR A FLOWING ELECTROLYTE BATTERY

(75) Inventor: Alexander Rudolf Winter, Brookfield (AU)

(73) Assignee: Redflow Pty Ltd, Queensland (AU)

( * ) Notice: Subject to any disclaimer, the term of this patent is extended or adjusted under 35 U.S.C. 154(b) by 381 days.

(21) Appl. No.: 12/530,728

(22) PCT Filed: Mar. 13, 2008

(86) PCT No.: PCT/AU2008/000353
§ 371 (c)(1),
(2), (4) Date: Jan. 6, 2010

(87) PCT Pub. No.: WO2008/116248
PCT Pub. Date: Oct. 2, 2008

(65) Prior Publication Data
US 2010/0119937 A1    May 13, 2010

(30) Foreign Application Priority Data
Mar. 28, 2007    (AU) ................ 2007901653

(51) Int. Cl.
*H01M 2/38* (2006.01)
*H01M 2/14* (2006.01)
*H01M 6/04* (2006.01)
*H01M 10/26* (2006.01)

(52) U.S. Cl. ............ 429/81; 429/51; 429/163; 429/206; 429/247

(58) Field of Classification Search ............... 429/404, 429/508, 72, 105, 70, 149, 50, 51, 81, 99, 429/163, 247, 206, 402, 454, 199, 469, 463
See application file for complete search history.

(56) References Cited

U.S. PATENT DOCUMENTS

| | | | | |
|---|---|---|---|---|
| 3,395,047 A | * | 7/1968 | Terry et al. | 429/454 |
| 3,578,503 A | * | 5/1971 | Bloch et al. | 429/402 |
| 3,811,945 A | * | 5/1974 | De Rossi | 429/105 |
| 4,139,679 A | * | 2/1979 | Appleby et al. | 429/404 |
| 4,218,521 A | * | 8/1980 | Putt et al. | 429/508 |
| 4,732,823 A | * | 3/1988 | Ito et al. | 429/72 |
| 5,851,694 A | * | 12/1998 | Miyabayashi et al. | 429/105 |
| 2002/0119365 A1 | * | 8/2002 | Tomazic | 429/70 |

(Continued)

FOREIGN PATENT DOCUMENTS
EP    0089433    9/1986
(Continued)

*Primary Examiner* — Jonathan Crepeau
*Assistant Examiner* — Kenneth Douyette
(74) *Attorney, Agent, or Firm* — Neifeld IP Law, PC

(57) ABSTRACT

A cell stack (700) as provided enables a flowing electrolyte battery to have a reduced size and weight. The cell stack (700) includes a casing having a positive polarity end and a negative polarity end. A plurality of half cells (805) are inside the casing, and each half cell (805) includes an electrode plate (705), an adjacent separator plate (715), and at least one capillary tube (727) positioned between the electrode plate (705) and the adjacent separator plate (715). The capillary tube (727) has a first end extending outside of the half cell (805) and a second end located inside the half cell (805). At least one manifold (530) is in hydraulic communication with a plurality of capillary tube ends including the first end of the capillary tube (727) in each half cell (805). The capillary tube (727) in each half cell (805) enables electrolyte to circulate through the plurality of half cells (805) via the at least one manifold (530).

19 Claims, 7 Drawing Sheets

U.S. PATENT DOCUMENTS

2003/0194605 A1* 10/2003 Fauteux et al. ............... 429/149
2005/0074665 A1* 4/2005 Spaziante et al. ............... 429/50

FOREIGN PATENT DOCUMENTS

| | | |
|---|---|---|
| EP | 0089433 B1 * | 9/1986 |
| EP | 0208358 | 9/1987 |
| EP | 0093213 | 1/1991 |
| JP | 05-166550 | 7/1993 |
| JP | 07-065871 | 3/1995 |
| WO | WO 02029915 | 4/2002 |

* cited by examiner

CELL STACK FOR A FLOWING ELECTROLYTE BATTERY

This is a U.S. national phase entry of International application PCT/AU2008/000353, filed 13 Mar. 2008, published WO 2008/116248, which claims priority to Australian application 2007901653 filed 28 Mar. 2007.

FIELD OF THE INVENTION

The present invention relates to batteries. In particular, although not exclusively, the invention relates to a flowing electrolyte battery having a cell stack including capillary tubes.

BACKGROUND TO THE INVENTION

Batteries used in stand alone power supply systems are commonly lead-acid batteries. However, lead-acid batteries have limitations in terms of performance and environmental safety. Typical lead-acid batteries often have very short lifetimes in hot climate conditions, especially when they are occasionally fully discharged. Lead-acid batteries are also environmentally hazardous, since lead is a major component of lead-acid batteries and can cause serious environmental problems during manufacturing and disposal.

Flowing electrolyte batteries, such as zinc-bromine batteries, zinc-chlorine batteries, and vanadium flow batteries, offer a potential to overcome the above mentioned limitations of lead-acid batteries. In particular, the useful lifetime of flowing electrolyte batteries is not affected by deep discharge applications, and the energy to weight ratio of flowing electrolyte batteries is up to six times higher than that of lead-acid batteries.

However, manufacturing flowing electrolyte batteries can be more difficult than manufacturing lead-acid batteries. A flowing electrolyte battery, like a lead acid battery, comprises a stack of cells to produce a certain voltage higher than that of individual cells. But unlike a lead acid battery, cells in a flowing electrolyte battery are hydraulically connected through an electrolyte circulation path. This can be problematic as shunt currents can flow through the electrolyte circulation path from one series-connected cell to another causing energy losses and imbalances in the individual charge states of the cells. To prevent or reduce such shunt currents, flowing electrolyte batteries define sufficiently long electrolyte circulation paths between cells, thereby increasing electrical resistance between cells.

Another problem of flowing electrolyte batteries is a need for a uniform electrolyte flow rate in each cell in order to supply chemicals evenly inside the cells. To achieve a uniform flow rate through the cells, flowing electrolyte batteries define complex flow distribution zones. However, because electrolyte often has an oily and gaseous multiphase nature, and because of structural constraints on the cells, uniform flow rates are often not achieved.

Referring to FIG. 1, a flow diagram illustrates a basic zinc-bromine flowing electrolyte battery 100, as known according to the prior art. The zinc-bromine battery 100 includes a negative circulation path 105 and an independent positive circulation path 110. The negative circulation path 105 contains zinc ions as an active chemical, and the positive circulation path 110 contains bromine ions as an active chemical. The zinc-bromine battery 100 also comprises a negative electrolyte pump 115, a positive electrolyte pump 120, a negative electrolyte tank 125, and a positive electrolyte tank 130. To obtain high voltage, the zinc-bromine battery 100 further comprises a stack of cells connected in a bipolar arrangement. For example, a cell 135 comprises half cells 140, 145 including bipolar electrode plate 155 and a micro porous separator plate 165. The zinc-bromine battery 100 then has a positive polarity end at a collector electrode plate 160, and a negative polarity end at a collector electrode plate 150.

A chemical reaction in a positive half cell, such as the half cell 145, during charging can be described according to the following equation:

$$2Br^- \rightarrow 2Br + 2e^- \qquad \text{Eq. 1}$$

Bromine is thus formed in half cells in hydraulic communication with the positive circulation path 110 and is then stored in the positive electrolyte tank 130. A chemical reaction in a negative half cell, such as the half cell 140, during charging can be described according to the following equation:

$$Zn^{2+} + 2e^- \rightarrow Zn \qquad \text{Eq. 2}$$

A metallic zinc layer 170 is thus formed on the collector electrode plate 150 in contact with the negative circulation path 105. Chemical reactions in the half cells 140, 145 during discharging are then the reverse of Eq. 1 and Eq. 2.

The prior art discloses various approaches for creating flow distribution zones that obtain uniform flow rates, and for creating substantially long circulation paths between cells in a cell stack of a flowing electrolyte battery. One approach defines coiled capillary tubes inside external manifolds that supply electrolyte to a cell stack. The coiled capillary tubes are connected to flow distribution zones defined in the cells via an array of elastomer connection tubes. Each cell has multiple inlets and outlets, and thus each external manifold has to be connected to the cell stack using a delicate connection apparatus comprising an array of elastomer connection tubes. A typical 54-cell stack requires 216 elastomer connection tubes. Such a delicate connection apparatus is not only difficult to manufacture, but is also prone to damage during assembly and use.

Another approach uses long circulation paths and flow distribution zones defined within cells. That reduces a number of external connection points. However, each cell in a cell stack then has to be welded internally to ensure that electrolyte does not leak out of a circulation path. A typical 60-cell stack may therefore have only 8 inlets/outlets, but it may have 121 critical external and internal weld seams.

Referring to FIG. 2, a diagram illustrates a perspective view of a cell stack 200 for a flowing electrolyte battery, as known according to the prior art. Cells in the cell stack 200 are connected to external manifolds 205 via an array of elastomer connection tubes 210. The cell stack 200 has 10 critical welding seams: a top welding seam 215, a bottom welding seam 216, four inlet/outlet tube sealing welding seams 225, and four manifold-tube welding seams 230.

Referring to FIG. 3, a diagram illustrates the supply of electrolyte to cells in the cell stack 200, as known according to the prior art. A coiled capillary tube 305 is placed in an external manifold 205 and connected to a flow distribution zone 310 defined in an electrode plate 315 via an elastomer connection tube 210.

Referring to FIG. 4, a diagram illustrates uneven electrolyte flow distribution along the electrode plate 315 of the cell stack 200, as known according to the prior art. Long arrows 400 indicate significant electrolyte flow rates across ends of the electrode plate 315; whereas short arrows 405 indicate reduced electrolyte flow rates across a middle section of the electrode plate 315. An over supply of electrolyte to any section of the electrode will cause a reduction in the efficiency of the battery. An under supply of electrolyte to any section of the electrode can permit dendrite formation which may lead to permanent damage to the separator and shorting between cells.

There is therefore a need to overcome or alleviate many of the above discussed problems associated with flowing electrolyte batteries of the prior art.

OBJECTS OF THE INVENTION

Therefore, an object of the present invention is to overcome or alleviate one or more limitations of the prior art including providing improved structures for circulating electrolyte through battery cells to reduce manufacturing costs and to improve structural robustness of a cell stack for a flowing electrolyte battery, but without increasing a battery size.

A further object of the present invention is to provide an improved electrode plate to reduce manufacturing costs and to improve structural robustness of a cell stack for a flowing electrolyte battery.

SUMMARY OF THE INVENTION

According to one aspect, the present invention is a cell stack for a flowing electrolyte battery. The cell stack includes a casing having a positive polarity end and a negative polarity end, and a plurality of half cells inside the casing. Each half cell includes an electrode plate, an adjacent separator plate, and at least one capillary tube positioned between the electrode plate and the adjacent separator plate. The capillary tube has a first end extending outside of the half cell and a second end located inside the half cell. At least one manifold is in hydraulic communication with a plurality of capillary tube ends including the first end of the capillary tube in each half cell, and the capillary tube in each half cell enables electrolyte to circulate through the plurality of half cells via the at least one manifold.

Optionally, the casing comprises a positive end plate adjacent the positive polarity end, a negative end plate adjacent the negative polarity end, and a plurality of side plates.

Optionally, the at least one side plate of the plurality of side plates has a capillary tube bus plate sealing the plurality of capillary tube ends including the first end of the capillary tube in each half cell.

Optionally, the capillary tube in each half cell provides a high electrical resistance between electrolyte at the first end and electrolyte at the second end.

Optionally, each electrode plate comprises a first capillary tube channel for receiving a portion of the capillary tube.

Optionally, each electrode plate comprises a second capillary tube channel for receiving a portion of a capillary tube in an adjacent half cell sharing a common separator plate.

Optionally, the second capillary tube channel and the first capillary tube channel do not overlap.

Optionally, at least one capillary tube has a U-shaped section to increase a length of the capillary tube.

Optionally, the flowing electrolyte battery further comprises four manifolds, wherein the casing is hollow and a manifold is positioned at each of four corners of the cell stack, and the manifolds cover the plurality of capillary tube ends.

Optionally, the cell stack is connected to a pump for circulating electrolyte through the manifold and the plurality of half cells.

Optionally, the second end of the capillary tube is coupled to a flow distribution zone connected to an electrode cavity of the half cell for evenly distributing electrolyte through the electrode cavity of the half cell, wherein the electrode cavity of the half cell is defined between the electrode plate and the adjacent separator plate.

Optionally, the second end of the capillary tube is coupled to a flow collection zone connected to an electrode cavity of the half cell for evenly collecting electrolyte from the electrode cavity of the half cell, wherein the electrode cavity of the half cell is defined between the electrode plate and the adjacent separator plate.

Optionally, the flowing electrolyte battery is a zinc-bromine battery, a zinc-chlorine battery, a vanadium-vanadium battery, a vanadium-bromine battery, or any other chemistry suitable for electrical energy storage.

Optionally, the electrode plate comprises a conductive electrode, a nonconductive frame surrounding the conductive electrode, and spacer strips on the conductive electrode.

Optionally, the casing has six welding seams comprising a top welding seam, a bottom welding seam, and four manifold welding seams.

Optionally, the flowing electrolyte battery further comprises a charger.

Optionally, the flowing electrolyte battery further comprises an inverter.

Optionally, a flow direction of electrolyte in a half cell is aligned with a longer side of the half cell.

BRIEF DESCRIPTION OF THE DRAWINGS

To assist in understanding the invention and to enable a person skilled in the art to put the invention into practical effect, preferred embodiments of the invention are described below by way of example only with reference to the accompanying drawings, in which.

Figure 1:
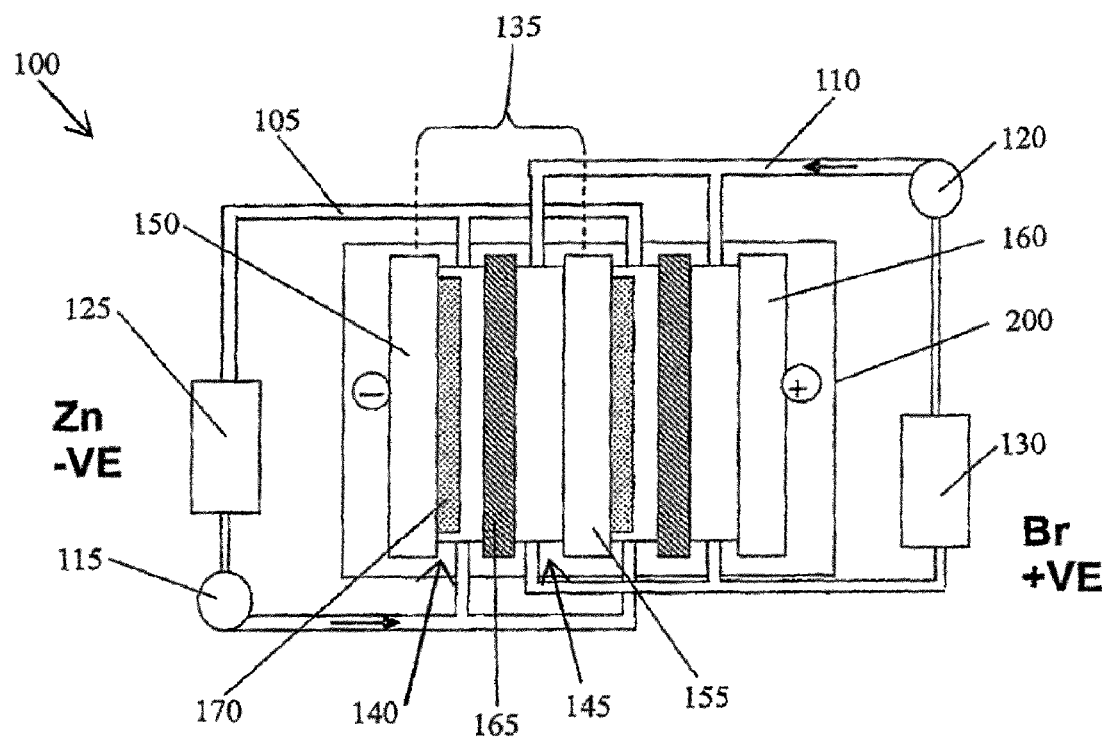
FIG. 1 is a diagram illustrating a basic zinc-bromine flowing electrolyte battery, as known according to the prior art.
Figure 2:
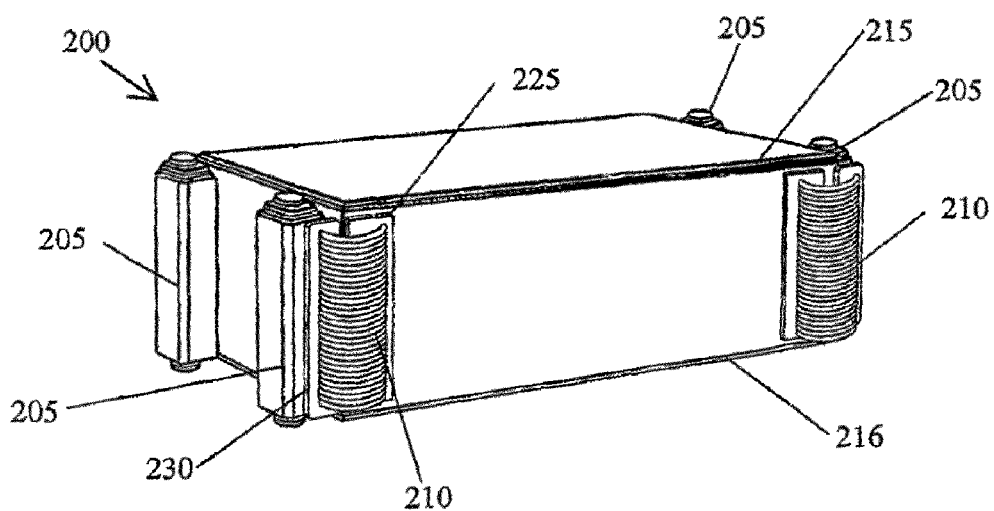
FIG. 2 is a diagram illustrating a perspective view of a flowing electrolyte battery encased in a rectangular casing, as known according to the prior art.
Figure 3:
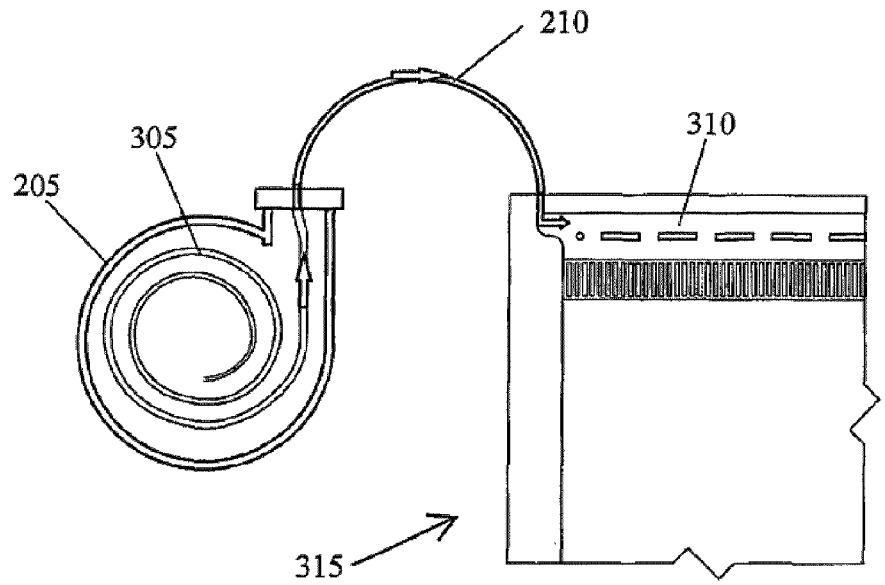
FIG. 3 is a diagram illustrating the supply of electrolyte to cells in a flowing electrolyte battery, as known according to the prior art.
Figure 4:
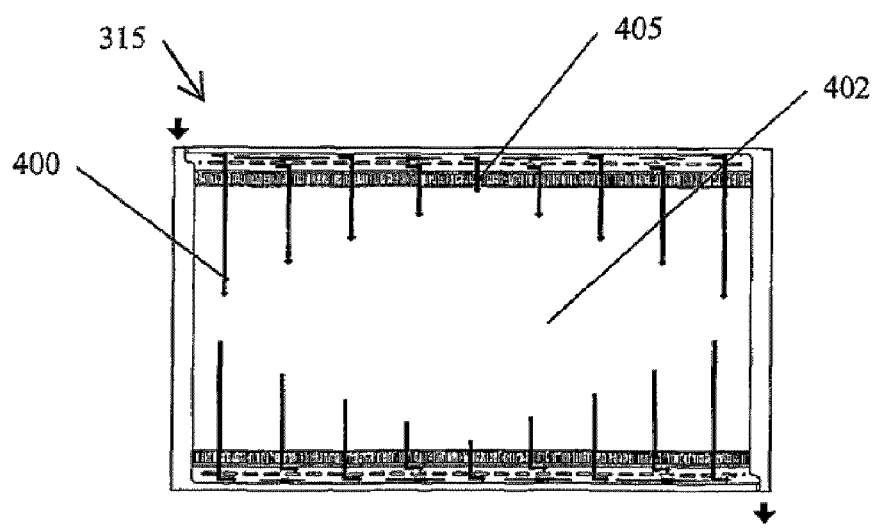
FIG. 4 is a diagram illustrating uneven electrolyte flow distribution along an electrode plate of a flowing electrolyte battery, as known according to the prior art.

Those skilled in the art will appreciate that minor deviations from the symmetrical layout of components as illustrated in the drawings will not detract from the proper functioning of the disclosed embodiments of the present invention.

DETAILED DESCRIPTION OF THE INVENTION

Embodiments of the present invention comprise a cell stack for a flowing electrolyte battery. Elements of the invention are illustrated in concise outline form in the drawings, showing only those specific details that are necessary to understanding the embodiments of the present invention, but so as not to clutter the disclosure with excessive detail that will be obvious to those of ordinary skill in the art in light of the present description.

In this patent specification, adjectives such as first and second, left and right, front and back, top and bottom, etc., are used solely to define one element or method step from another element or method step without necessarily requiring a specific relative position or sequence that is described by the adjectives. Words such as "comprises" or "includes" are not used to define an exclusive set of elements or method steps. Rather, such words merely define a minimum set of elements or method steps included in a particular embodiment of the present invention.

Figure 5:
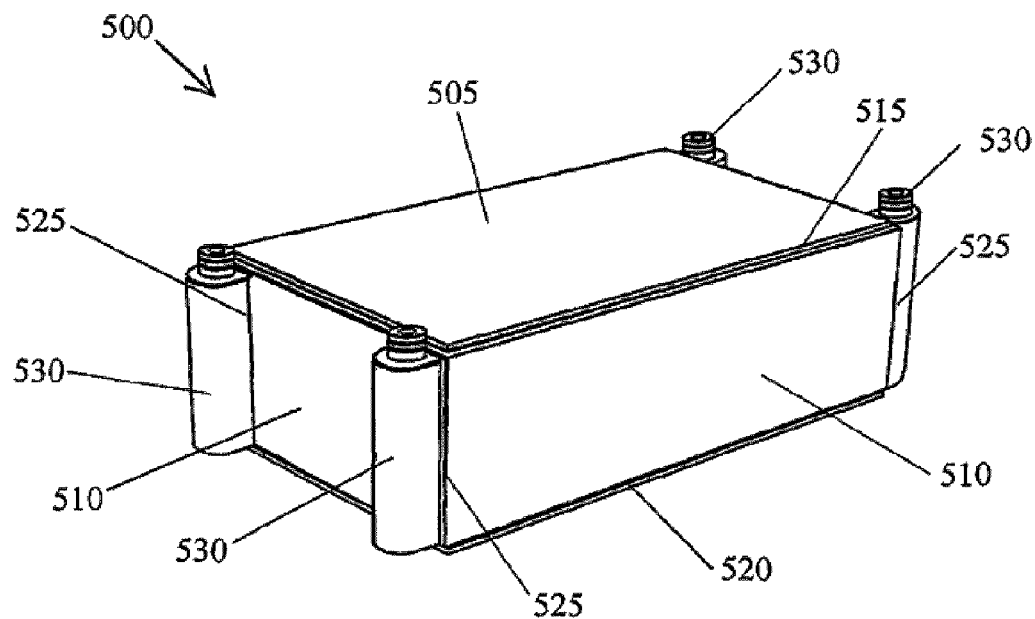
FIG. 5 is a diagram illustrating a perspective view of a cell stack of a flowing electrolyte battery that eliminates elastomer connection tubes and has substantially fewer critical welding seams than the prior art, according to some embodiments of the present invention.

Referring to FIG. 5, a diagram illustrates a perspective view of a cell stack 500 of a flowing electrolyte battery, according to some embodiments of the present invention. The cells in the cell stack 500 are encased inside a rectangular casing comprising a negative end plate 505, a positive end plate (not shown), and four side plates 510. The negative end plate 505 is adjacent to a negative polarity end of the cell stack 500 and the positive end plate is adjacent to a positive polarity end of the cell stack 500. The cell stack 500 therefore has a total of only six critical welding seams: a top welding seam 515, a bottom welding seam 520, and one manifold welding seam 525 for each of four manifolds 530. Among other advantages, the cell stack 500 eliminates the elastomer connection tubes 210 described above concerning the prior art, reduces the number of critical welding seams described above concerning the prior art, and provides for improved electrolyte flow distribution.

Figure 6:
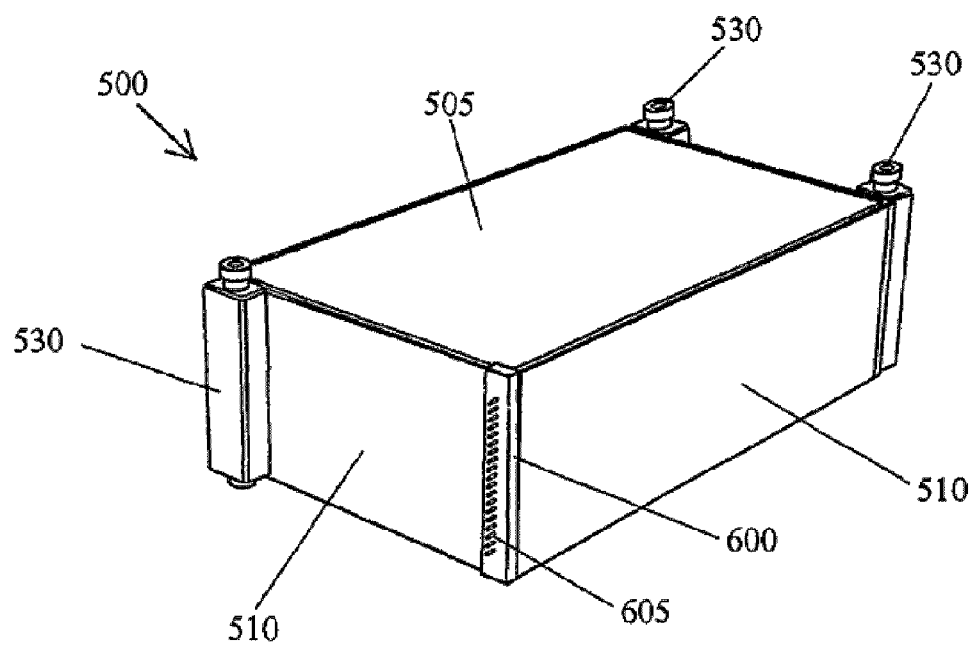
FIG. 6 is a diagram illustrating a perspective view of a weld seam that connects a manifold to a cell stack, according to some embodiments of the present invention.

Referring to FIG. 6, a diagram illustrates a perspective view of the cell stack 500 showing where one manifold 530 has been removed, according to some embodiments of the present invention. Underneath the removed manifold 530 is a capillary tube bus plate 600 that includes ports 605 that are connected to individual cells of the cell stack 500. A manifold 530 thus can be easily attached to a cell stack via a capillary tube bus plate 600 without using an array of elastomer connection tubes.

Figure 7:
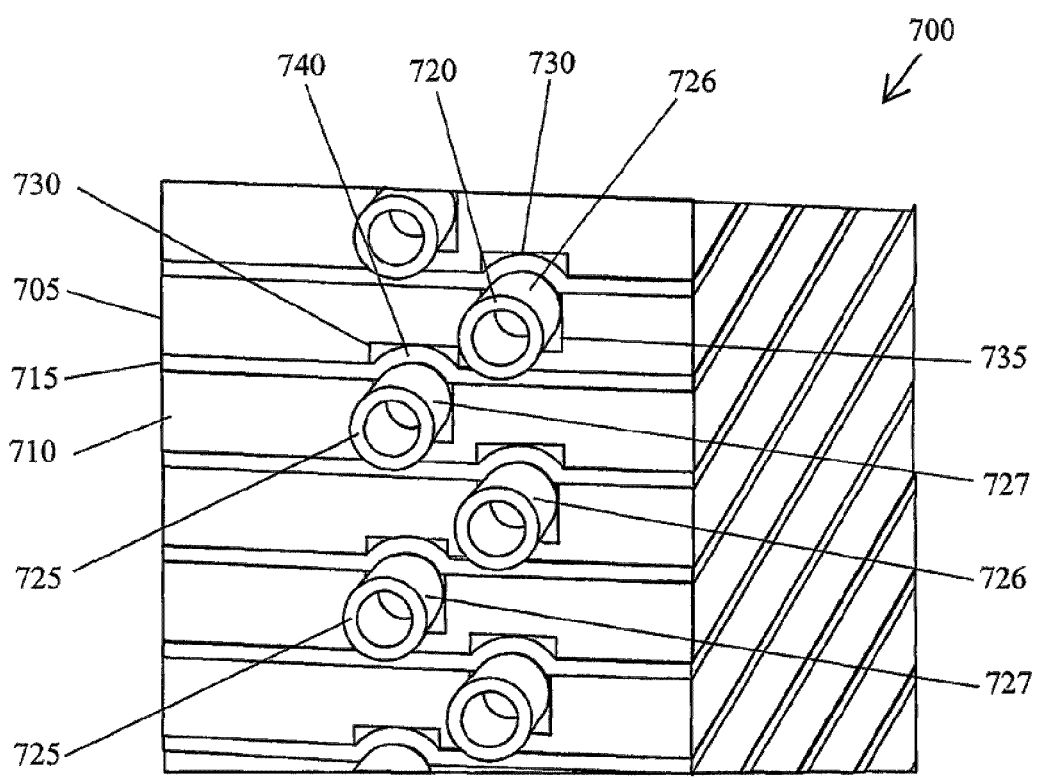
FIG. 7 is a diagram illustrating a perspective view of a partial cell stack comprising alternating electrode plates and separator plates, according to some embodiments of the present invention.

Referring to FIG. 7, a diagram illustrates a close up perspective view of a partial cell stack 700 of the cell stack 500, according to some embodiments of the present invention. The partial cell stack 700 comprises alternating electrode plates 705, 710 and separator plates 715. A plurality of first ends 720, 725 of staggered capillary tubes 726, 727 extend out of the partial cell stack 700. The first ends 720, 725 are hydraulically connected to the ports 605 of a capillary tube bus plate 600.

Each electrode plate 705, 710 includes first capillary tube channels 735 that are formed on the electrode plates 705, 710, and receive a portion of the capillary tubes 726, 727. Each electrode plate 705, 710 also includes second capillary tube channels 730 that are formed on the electrode plates 705, 710, and also receive a portion of the capillary tubes 726, 727. The separator plates 715 are made of a flexible material to allow an indentation 740 along the second capillary tube channels 730. As shown, the first and second capillary tube channels 730, 735, and the staggered arrangement of the capillary tubes 726, 727, enable a diameter of the capillary tubes 726, 727 to be large relative to a thickness of the electrode plates 705, 710. The thickness of the electrode plates 705, 710 thus can be reduced, which decreases the size and weight of the cell stack 500.

Figure 8:
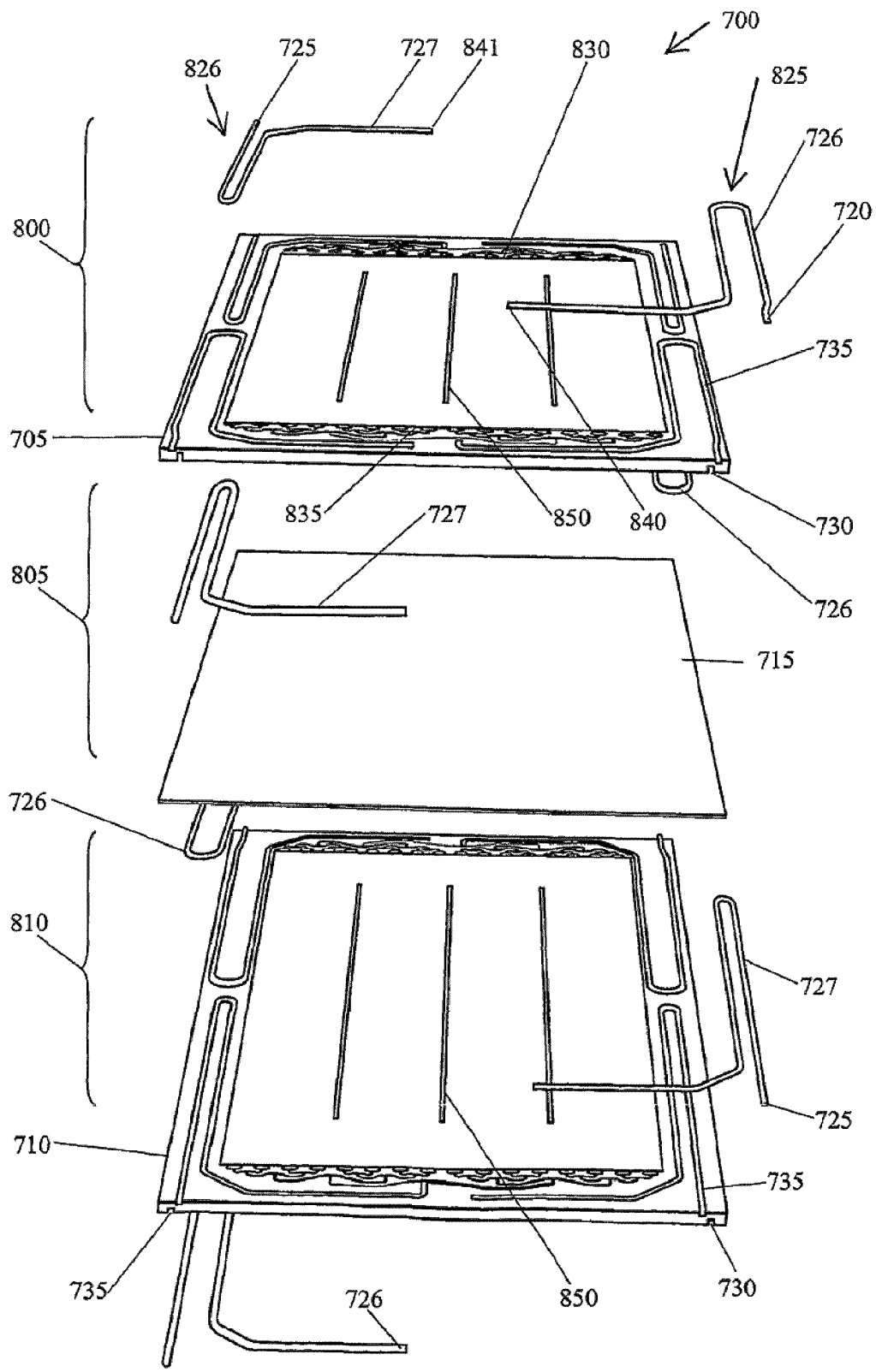
FIG. 8 is a diagram illustrating an exploded view of placements of capillary tubes in half cells, according to some embodiments of the present invention.

Referring to FIG. 8, a diagram illustrates an exploded view of three half cells 800, 805, 810 of the partial cell stack 700 of the cell stack 500, according to some embodiments of the present invention. Capillary tubes 726, 727, including the first ends 720, 725 of the capillary tubes 726, 727, respectively, are shown separated from the first and second capillary tube channels 730, 735. The capillary tubes 726, 727 include U-shaped portions 825, 826, respectively. A purpose of the U-shaped portions 825, 826 is to increase a length of the capillary tubes 726, 727 in order to provide a greater electrical resistance between half cells.

As shown in FIG. 8, two adjacent electrode plates 705, 710 create the two half cells 805, 810 by sharing a separator plate 715. Each half cell 805, 810 has two capillary tubes 726, 727: one for supplying electrolyte and another one for collecting electrolyte. The two capillary tubes 726, 727 are placed at diagonally opposite corners of an electrode plate 705, 710.

In each half cell 800, 805, 810 a flow distribution zone 830 for distributing electrolyte and a flow collection zone 835 for collecting electrolyte are connected to second ends 841, 840, respectively, of each capillary tube 727, 726, respectively. Thus in the half cell 800 a capillary tube 726 is connected to a flow collection zone 835, and a capillary tube 727 is connected to a flow distribution zone 830; whereas in the adjacent half cell 805 a capillary tube 726 is connected to a flow distribution zone 830, and a capillary tube 727 is connected to a flow collection zone 835. The second ends 840, 841 of the capillary tubes 726, 727 are located inside the half cells 800, 805, 810.

According to some embodiments of the present invention, the capillary tubes 726, 727 in the two adjacent half cells 805, 810 sharing the separator plate 715 are placed at different corners of the separator plate 715 such that the capillary tubes 726, 727 do not touch each other, even if the separator plate 715 is removed. For example, the capillary tube 727 in the half cell 810 is placed at a right front corner of the separator plate 715, whereas the capillary tube 727 in the adjacent half cell 805 is placed at a left front corner of the separator plate 715. Similarly, the capillary tube 726 in the half cell 810 is placed at a left back corner of the separator plate 715, whereas the capillary tube 726 in the adjacent half cell 805 is placed at a right back corner of the separator plate 715. That enables the capillary tubes 726, 727 to form a nested and staggered arrangement in the partial cell stack 700, as shown in FIG. 7.

According to some embodiments of the present invention, the electrode plate 705 can be identical to the electrode plate 710, and the partial cell stack 700 is constructed by using alternate orientations of the electrode plates 705, 710. For example, if the electrode plate 705 shown in FIG. 8 is rotated about a vertical axis 180 degrees clockwise (as viewed from the top of FIG. 8), its orientation becomes identical to an orientation of the adjacent electrode plate 710.

Figure 9:
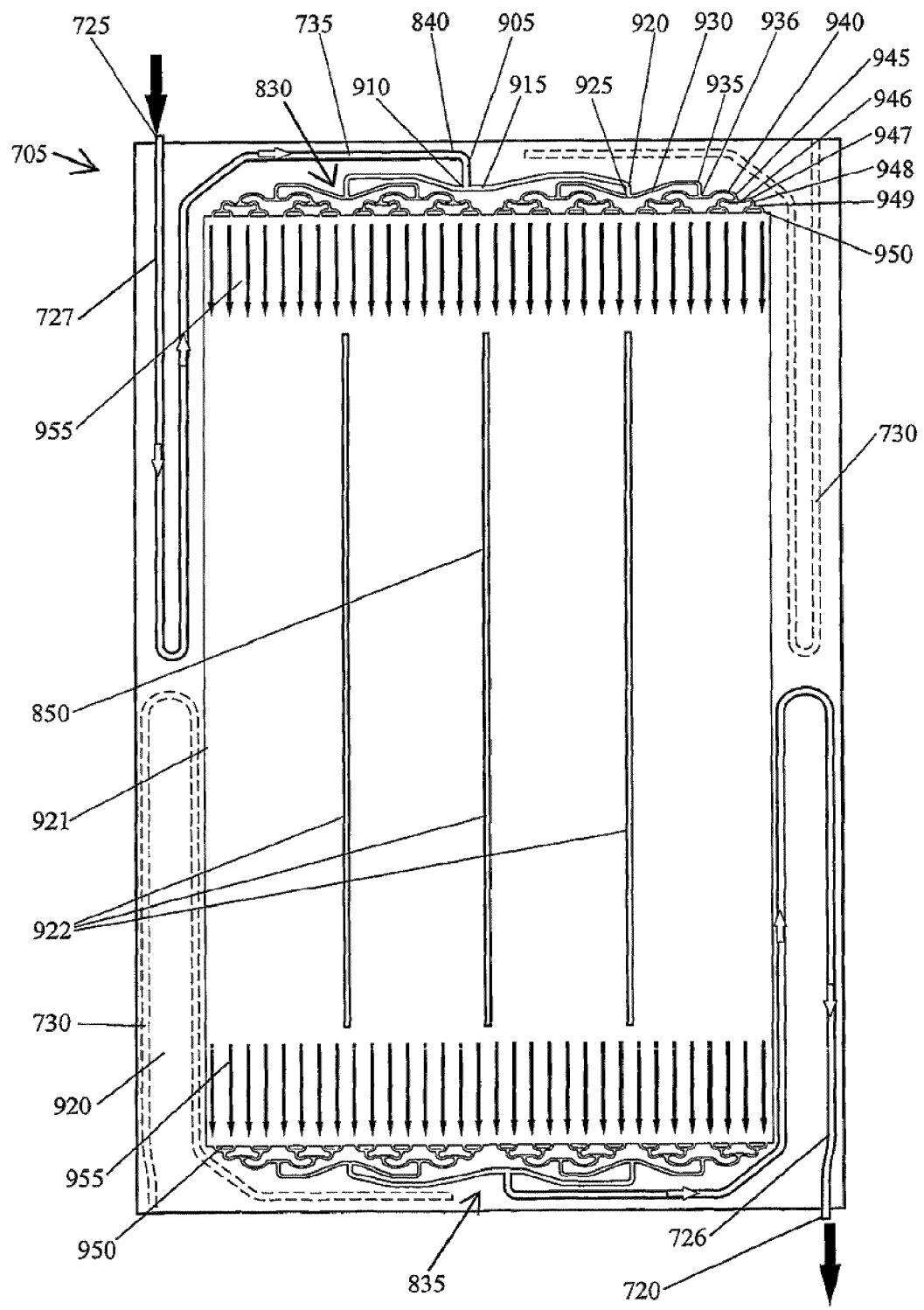
FIG. 9 is a diagram illustrating an electrode plate having a planar configuration of flow distribution zones, and a planar arrangement of capillary tubes and capillary tube channels, according to some embodiments of the present invention.

Referring to FIG. 9, a diagram illustrates a planar view of one electrode plate 705 of the cell stack 500, according to some embodiments of the present invention. Arrows represent a flowing electrolyte path from a first end 725 of a capillary tube 727, through a flow distribution zone 830, across a face of the electrode plate 705, through a flow collection zone 835, and through a capillary tube 726 to a first end 720. According to some embodiments of the present invention, the flow distribution zone 830 and the flow collection zone 835 are placed on opposite ends of a central longitudinal axis 850 of the electrode plate 705 rather than on opposite ends of a transverse axis of the electrode plate 705. That reduces a necessary width of the flow distribution zone 830 and the flow collection zone 835, which enables a more efficient flow distribution.

A first capillary tube channel 735 connects to a trunk 905 of a first bifurcation 910 in the flow distribution zone 830. Branches 915 of the first bifurcation 910 in turn connect to trunks 920 of second bifurcations 925. Similarly, branches 930 of the second bifurcations 925 connect to trunks 935 of third bifurcations 936; branches 940 of the third bifurcations 936 connect to trunks 945 of fourth bifurcations 946; and branches 947 of the fourth bifurcations connect to trunks 948 of fifth bifurcations 949. Finally, branches 950 of the fifth bifurcations 949 connect to the electrode cavity 845. Second bifurcations 925, third bifurcations 936, fourth bifurcations 946, and fifth bifurcations 949 are symmetrically arranged around a central longitudinal axis 850 of the electrode plate 705. The branches 950 of the fifth bifurcations 949 are also symmetrically arranged around the central longitudinal axis 850. That means that the branches 950 are evenly distributed across a side of the electrode plate 705 and enable a uniform flow of electrolyte across a conductive electrode 921 of the electrode plate 705.

Similarly, the flow collection zone 835 also has first, second, third, fourth and fifth bifurcations. Thus, as shown in FIG. 9, the arrangement of bifurcations of the flow collection zone 835 can be identical to that of the flow distribution zone 830.

Each electrolyte distribution path from a branch 950 of a fifth bifurcation 949 to the trunk 905 of the first bifurcation 910 is approximately equal in length. Further, an equal number of right angle bends are included in each path from the trunk 905 to each branch 950 of a fifth bifurcation 949. That results in a generally equal hydraulic resistance between the trunk 905 of the first bifurcation 910 and each branch 950 of the fifth bifurcations 949. Such generally equal hydraulic resistance provides a generally equal flow rate from each branch 950 of the fifth bifurcations 949, resulting in a uniform supply rate and a uniform collection rate of electrolyte across the conductive electrode 921 of the electrode plate 705 (as shown by equal length arrows 955).

The first end 725, as shown in FIG. 9, for supplying electrolyte connects to a manifold 530 via a capillary tube bus plate 600, and the first end 720 for collecting electrolyte connects to another manifold 530. An electrolyte circulation path is created by connecting the two manifolds 530 to a pump and an electrolyte tank. A suitable arrangement for such a pump and electrolyte tank are illustrated in FIG. 1 regarding the prior art.

The electrode plate 705 comprises the conductive electrode 921, a nonconductive frame 920 surrounding the conductive electrode 921, and a plurality of spacer strips 922 placed in a middle section of the conductive electrode 921. The spacer strips 922 create a space between a surface of the conductive electrode 921 and an adjacent separator plate 715 in the half cell 800 to provide an electrode cavity.

Figure 10:
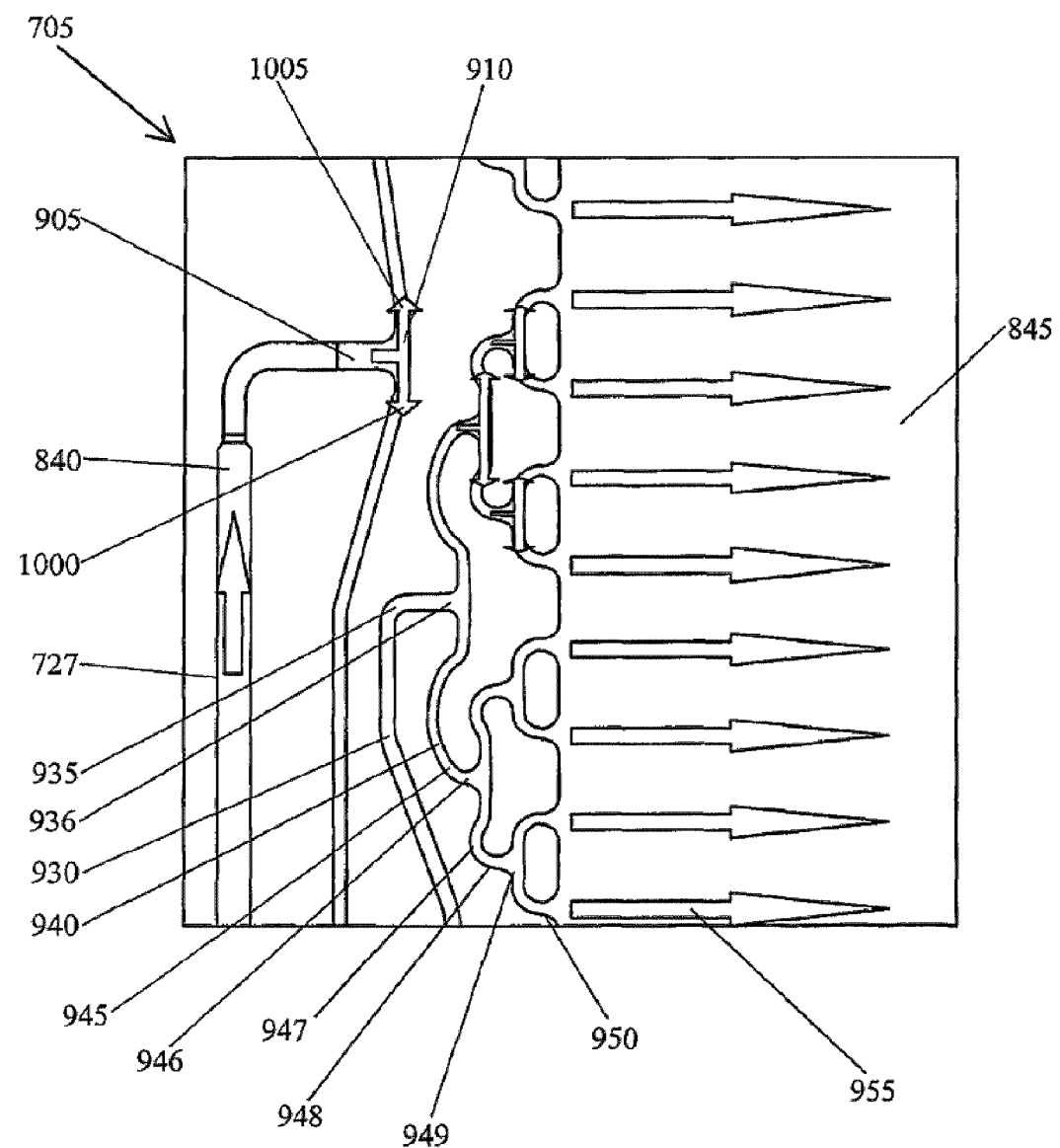
FIG. 10 is a diagram illustrating a detailed view of a flow distribution zone of an electrode plate comprising a plurality of interconnected bifurcations, according to some embodiments of the present invention.

Referring to FIG. 10, a diagram illustrates a detailed view of the first bifurcation 910 providing a symmetrical flow division as indicated by branching arrows 1000, 1005. Approximately equal flow rates at the branches 950 of the fifth bifurcations 949 (as shown by the equal length arrows 955) provide a uniform flow rate of electrolyte across the conductive electrode 921 of the electrode plate 705.

Optionally, the cell stack 500 is packaged with a built-in charger for filtering and regulating a power source, such as solar cells, and a built-in inverter to provide a regulated AC (alternating current) power supply. In addition, different varieties of chemicals, such as combinations of zinc, iron, vanadium, cerium, bromine and chlorine can be used according to various embodiments of the present invention.

In summary, advantages of some embodiments of the present invention include improved robustness and efficiency, and reduced size and weight of flowing electrolyte batteries. The staggered internal capillary tubes 726, 727 enable the electrode plates 705, 710 to be relatively thin, which in turn reduces the overall size and weight of the cell stack 500. Further, the flow distribution zones 830 and flow collection zones 835 comprising bifurcations provide uniform electrolyte distribution in cells, which improves battery efficiency and effectiveness. Placing capillary tubes internally enables the partial cell stack 700 to be in hydraulic communication with the external manifolds 530, without requiring the elastomer connection tubes 210 of the prior art, and without requiring extra critical welding seams, therefore reducing manufacturing costs and increasing robustness of the flowing electrolyte battery 500. Further, placing the flow distribution zones 830 and the flow collection zones 835 on each end of the longitudinal axis 850 of the electrode plates 705, reduces the width of the flow distribution zones 830 and the flow collection zones 835, further reducing the size and weight of the cell stack 500.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this patent specification is intended to embrace all alternatives, modifications and variations of the present invention that have been discussed herein, and other embodiments that fall within the spirit and scope of the above described invention.

Limitations in the claims should be interpreted broadly based on the language used in the claims, and such limitations should not be limited to specific examples described herein. In this specification, the terminology "present invention" is used as a reference to one or more aspects within the present disclosure. The terminology "present invention" should not be improperly interpreted as an identification of critical elements, should not be improperly interpreted as applying to all aspects and embodiments, and should not be improperly interpreted as limiting the scope of the claims.

I claim:

1. A cell stack for a flowing electrolyte battery, comprising:
   a casing having a positive polarity end and a negative polarity end;
   a plurality of half cells inside the casing, wherein each half cell comprises:
   an electrode plate;
   an adjacent separator plate; and
   at least one capillary tube positioned between the electrode plate and the adjacent separator plate, wherein the capillary tube has a first end extending outside of the half cell and a second end located inside the half cell; and at least one manifold in hydraulic communication with a plurality of capillary tube ends including the first end of the capillary tube in each half cell;

wherein the capillary tube in each half cell enables electrolyte to circulate through the plurality of half cells via the at least one manifold.

2. The cell stack according to claim 1, wherein the casing comprises a positive end plate adjacent the positive polarity end; a negative end plate adjacent the negative polarity end; and a plurality of side plates.

3. The cell stack according to claim 1, wherein the at least one side plate of the plurality of side plates has a capillary tube bus plate sealing the plurality of capillary tube ends including the first end of the capillary tube in each half cell.

4. The cell stack according to claim 1, wherein each electrode plate comprises a first capillary tube channel for receiving a portion of the capillary tube.

5. The cell stack according to claim 4, wherein each electrode plate comprises a second capillary tube channel for receiving a portion of a capillary tube in an adjacent half cell sharing a common separator plate.

6. The cell stack according to claim 5, wherein the second capillary tube channel and the first capillary tube channel do not overlap.

7. The cell stack according to claim 1, wherein the at least one capillary tube has a U-shaped section to increase a length of the capillary tube.

8. The cell stack according to claim 1, wherein the flowing electrolyte battery further comprises four manifolds, wherein the casing is hollow and a manifold is positioned at each of four corners of the casing, and the manifolds cover the plurality of capillary tube ends.

9. The cell stack according to claim 1, wherein the cell stack is connected to a pump for circulating electrolyte through the manifold and the plurality of half cells.

10. The cell stack according to claim 1, wherein the second end of the capillary tube is coupled to a flow distribution zone connected to an electrode cavity of the half cell for evenly distributing electrolyte through the electrode cavity of the half cell, wherein the electrode cavity of the half cell is defined between the electrode plate and the adjacent separator plate.

11. The cell stack according to claim 1, wherein the second end of the capillary tube is coupled to a flow collection zone connected to an electrode cavity of the half cell for evenly collecting electrolyte from the electrode cavity of the half cell, wherein the electrode cavity of the half cell is defined between the electrode plate and the adjacent separator plate.

12. The cell stack according to claim 1, wherein the flowing electrolyte battery is a zinc-bromine battery, a zinc-chlorine battery, a vanadium-vanadium battery, a vanadium-bromine battery, or a zinc-cerium battery.

13. The cell stack according to claim 1, wherein the electrode plate comprises:
a conductive electrode;
a nonconductive frame surrounding the conductive electrode; and
spacer strips on the conductive electrode.

14. The cell stack according to claim 1, wherein the casing has six welding seams comprising a top welding seam, a bottom welding seam, and four manifold welding seams.

15. The cell stack according to claim 1, wherein the flowing electrolyte battery further comprises a charger.

16. The cell stack according to claim 1, wherein the flowing electrolyte battery further comprises an inverter.

17. The cell stack according to claim 1, wherein a flow direction of electrolyte in a half cell is aligned with a longer side of the half cell.

18. A cell stack for a flowing electrolyte battery, comprising:
a casing having a positive polarity end and a negative polarity end;
a plurality of half cells inside the casing, wherein each half cell comprises:
an electrode plate;
an adjacent separator plate; and
at least one capillary tube positioned between the electrode plate and the adjacent separator plate, wherein the capillary tube has a first end pointing outside of the half cell and a second end pointing inside the half cell; and
at least one manifold in hydraulic communication with a plurality of capillary tube ends including the first end of the capillary tube in each half cell;
wherein the capillary tube in each half cell enables electrolyte to circulate through the plurality of half cells via the at least one manifold.

19. A cell stack for a flowing electrolyte battery, comprising:
a casing having a positive polarity end and a negative polarity end;
a plurality of half cells inside the casing, wherein each half cell comprises:
an electrode plate;
an adjacent separator plate; and
at least one capillary tube positioned between the electrode plate and the adjacent separator plate, wherein the electrode plate comprises a capillary tube channel for receiving a portion of the capillary tube; and
at least one manifold in hydraulic communication with a plurality of capillary tube ends in each half cell;
wherein the capillary tube in each half cell enables electrolyte to circulate through the plurality of half cells via the at least one manifold.

* * * * *